United States Patent
Sosseh et al.

(10) Patent No.: US 11,120,825 B1
(45) Date of Patent: Sep. 14, 2021

(54) MODIFYING SEEK OPERATIONS MID-SEEK

(71) Applicant: Seagate Technology LLC, Cupertino, CA (US)

(72) Inventors: Raye A. Sosseh, Minneapolis, MN (US); Brian Thomas Edgar, Minneapolis, MN (US); Josiah Natan Wernow, St. Paul, MN (US); Paul Michael Wiggins, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/855,069

(22) Filed: Apr. 22, 2020

(51) Int. Cl.
*G11B 15/46* (2006.01)
*G11B 5/54* (2006.01)
*G11B 5/55* (2006.01)

(52) U.S. Cl.
CPC .................................. *G11B 5/5547* (2013.01)

(58) Field of Classification Search
CPC ..... G11B 21/106; G11B 5/012; G11B 5/4813; G11B 5/4886; G11B 5/5547; G11B 5/5578; G11B 27/36; G06F 3/0659; G06F 3/061; G06F 3/0683; G06F 12/1466; G06F 2212/1052

USPC .................................................. 360/75, 73.08
See application file for complete search history.

(56) References Cited

U.S. PATENT DOCUMENTS

| | | | |
|---|---|---|---|
| 5,268,884 A | 12/1993 | Kiuchi et al. | |
| 6,907,499 B2 | 6/2005 | Herbst et al. | |
| 6,940,684 B2 | 9/2005 | Yoshioka et al. | |
| 7,480,754 B2 | 1/2009 | Priborsky et al. | |
| 7,610,414 B2 * | 10/2009 | Kobashi | G06F 3/0613 |
| | | | 709/213 |
| 9,229,661 B2 * | 1/2016 | Rehm | G06F 3/0653 |
| 9,411,539 B2 * | 8/2016 | Chiu | G06F 3/0659 |

* cited by examiner

*Primary Examiner* — Nabil Z Hindi
(74) *Attorney, Agent, or Firm* — Mueting Raasch Group

(57) ABSTRACT

Illustrative systems and methods disclosed herein may change or modify a seek during mid-seek for various reasons and may set seek speeds for various seeks to less than the maximum possible seek speed to, for example, facilitate seek target change or modifications mid-seek. For instance, the seek speeds for lower priority commands or commands at risk for deprioritization may be set to speeds less than the maximum possible seek speed.

20 Claims, 7 Drawing Sheets

MODIFYING SEEK OPERATIONS MID-SEEK

The present disclosure relates to modifying or changing seek operations during mid-seek in a hard disk drive (HDD).

SUMMARY

Various embodiments of the present disclosure relate to setting a maximum speed of seek operations based on a priority of a command associated with each seek operation. The seek operations of commands that are at risk for deprioritization may be limited to a maximum speed below a maximum possible speed for such seek operations.

In at least one embodiment, an exemplary apparatus may include a head to read or write data to a storage medium, an actuator operatively coupled to the head to move the head, and a controller comprising one or more processors. The controller may be operatively coupled to the actuator to control movement of the head. The controller may be configured to receive a first command and determine if the first command is at risk for deprioritization. If the first command is determined to be at risk for deprioritization, the controller may further be configured to set a maximum seek speed for a first seek operation to move the head to a selected location relative to the storage medium to perform the first command to a value that is less than a maximum possible seek speed of the head and actuator and initiate the first seek operation.

In at least one embodiment, an exemplary system may include a head to read or write data to a storage medium, an actuator operatively coupled to the head to move the head, and a controller comprising one or more processors. The controller may be operatively coupled to the actuator to control movement of the head. The controller may be configured to receive a first command and determine if the first command is at risk for deprioritization. If the first command is determined to be at risk for deprioritization the controller may further be configured to set a maximum seek speed for a first seek operation to move the head to a selected location relative to the storage medium to perform the first command to a value that is less than a maximum possible seek speed of the head and actuator, permit modification of the first seek operation, and initiate the first seek operation.

In at least one embodiment, an exemplary method may include determining if a first command is at risk for deprioritization; setting a maximum seek speed for a first seek operation to move a head to a selected location relative to a storage medium to perform the command to a value that is less than a maximum possible seek speed of the head and an actuator if the first command is at risk for deprioritization; and initiating the first seek operation.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
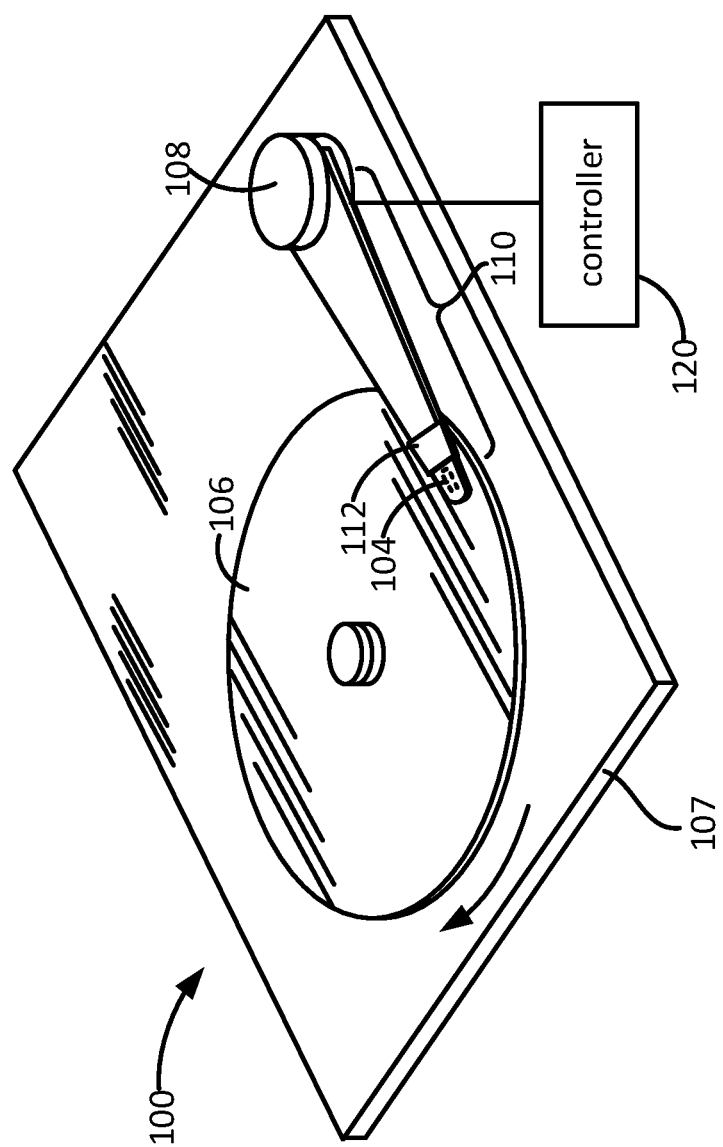
FIG. 1 is a perspective view of an HDD in accordance with embodiments of the present disclosure.

The present disclosure relates to systems, methods, and processes for changing a seek target mid-seek. Such systems, methods, and processes may include setting a maximum seek speed for seek operations in storage devices, such as hard disk drives (HDDs). Although the proposed systems, methods, and processes are described in the context of HDDs, such systems, methods, and processes may be applicable to other devices.

Seek operations (e.g., electromechanical repositioning using the actuator's Voice Coil Motor and microactuators) may be carried out, or executed, to perform commands received by HDDs. A seek operation may include a destination or seek target for an actuator and head of an associated HDD. The seek target may be the desired position of the head to perform the present command. Seek operations may include an acceleration phase, a maximum speed phase (e.g., if the seek target is far enough away from a current head location to allow the head to reach the maximum speed), and a deceleration phase. As used herein "seek speed" is the absolute value of the velocity of the actuator and head of a hard drive during a seek operation. In other words, seek speed is the magnitude of the seek velocity without regard to the direction that the actuator and head are moving during a seek operation.

New commands can be received by the HDD while a seek operation is in progress. Such new commands may include a new seek target different than the present seek target. Furthermore, such new commands may have a higher priority than a command associated with the present in-progress seek operation. However, in many existing systems, once a seek operation is initiated, the seek operation may be allowed to finish even if priorities of the HDD or system have changed and the associated command or request is no longer the present preferred use of the actuator and head. Thus, initiation of a seek operation in many existing systems represents near-total commitment to the seek operation and its associated command or request.

According to embodiments described herein, some seek operations for commands received by the HDD may be limited to a maximum seek speed lower than a maximum possible seek speed of the head and actuator. For example, commands that have a low priority may be at risk for deprioritization and seek operations of such commands may be limited to such maximum seek speed that is lower than a maximum possible seek speed. As used herein, the term "at risk for deprioritization" when describing a command relates to the command being at risk for co-existing (e.g., existing at the same time) in the device or system with commands of a higher priority. Commands at risk for deprioritization may include, for example, any number of speculative and/or background activities. The HDD may also perform non-speculative activities such that the priority of any given activity could change at any time (e.g., deprioritization), possibly due to the arrival of higher priority read or write commands from the host system. Higher priority commands may include, for example, read or write commands, verify write, verify write same, etc.

Limiting the seek speed of seek operations may allow the seek operation target to be changed while a seek operation is in progress (e.g., in order to divert the head to higher priority work). In other words, a servo that controls the position of the head can decelerate early, accelerate longer/faster to reach a new target further away, increase speed to a new target that is closer or farther away, or change direction (e.g., decelerating to zero velocity and accelerating in the opposite direction) because the seek speed is limited. In one embodiment, if an activity involving the head and actuator is deemed at risk for deprioritization (e.g., a background activity), a maximum speed of the associated seek operation may be reduced below a maximum possible speed to allow a seek operation target change to be implemented mid-seek (since, e.g., it may be more difficult to allow a seek target change when at the maximum possible speed, it may reduce power consumption, etc.).

The maximum possible speed may be a seek speed such that, e.g., if power to the HDD is lost, the seek operation can be stopped via back electromotive force (EMF) before the actuator slams into ramps, spindles, or other HDD parts and causes damage to the actuator head. The maximum possible seek speed may be a physical limitation, an imposed limit on the maximum possible seek speed for the HDD, the maximum speed that highest priority commands (e.g., commands not at risk for deprioritization) are carried out at, etc.

Further, it may be described that, the embodiments of this disclosure may allow a controller and servo of the HDD to collaborate to change the target of an in-progress seek operation in order to expedite higher priority actuator work in order to improve Command Completion Times (CCTs) or command response times. In some cases, lower priority work may be allowed to continue if the actuator position and velocity are such that a benefit may not be realized from redirecting the in-progress seek operation. The lower priority work may use a lower maximum speed so that the seek operation can be retargeted for a better CCT. Embodiments described herein help reduce the CCT penalty associated with lower priority HDD actuator work (e.g., background activities, cleaning/destaging). In some examples, if a seek operation is close to completion, changing the seek target mid-seek may not improve CCTs. In other words, it may be more efficient to allow the seek operation to complete before starting a new seek operation to the new target.

In some examples, the maximum seek speed may be increased to complete the initiated or in-progress seek operation faster. The maximum seek speed may be increased in response to, for example, a command queue exceeding a threshold level, reception of a lower priority command, reception of a higher priority command that has a faster CCT if the in-progress seek operation is completed without redirecting the seek operation, reception of a higher priority command that has a CCT less than a threshold period of time longer than if the in-progress seek operation is completed without redirecting the seek operation, a determination based on a cost benefit analysis to complete the current seek, etc.

FIG. 1 shows an isometric view of a hard drive apparatus 100 (e.g., an HDD) in accordance with embodiments of the present disclosure.

The apparatus 100 utilizes an actuating system to position a slider 104 over a spinning magnetic media 106 (e.g., a hard disk or magnetic disk). An electric motor (not shown) mounted on a basedeck 107 drives the media 106 to achieve the desired media velocity. The slider 104 includes a read/write head that records to and reads from the media 106. The illustrated actuating system is a dual-stage configuration, which includes a voice coil motor (VCM) 108 that drives an arm 110 with the slider 104 mounted at the end. The dual-stage actuating system also includes a microactuator 112 mounted in the arm 110 for fine tracking control of the slider 104. The microactuator 112 may be referred to herein as a "PZT" in reference to a piezoelectric material used in some microactuators. However, such reference is not meant to limit the disclosure to piezoelectric microactuators.

While only one arm 110 and slider 104 is shown, the apparatus 100 may include multiple such arms, one for each surface of each disk 106 employed in the apparatus 100. Each arm 110 may contain a microactuator 112 for individual fine tracking control, although all arms may be commonly driven by the VCM 108. A controller 120 is electrically coupled to the microactuator 112 and VCM 108 to apply control signals. The controller 120 may also be coupled to read data back from the microactuator 112, VCM 108, slider 104 (e.g., to determine position signals), and other sensors (e.g., temperature sensors). The controller 120 includes at least one of a processor, memory, and specialized logic and analog circuitry (e.g., digital signal processing circuitry, amplifiers, filters).

The illustrated microactuator 112 is shown located within a suspension of the arm 110. In other configurations, the microactuator 112 may be positioned elsewhere, such as between the end of the arm 110 and the slider 104. The functions of the microactuator 112 may include fine/fast tracking and seeking control, reduction of run-out and other functions that generally improve drive performance. While the illustrated dual-stage actuating system is shown as driving a pivoting arm 110, concepts described herein may be applicable to other types of drive systems, e.g., linear tracking arms.

The controller 120 may control movement of the microactuator 112 and the slider 104 that includes read/write heads. The controller 120 may be configured to receive commands and to initiate and/or control seek operations to perform such received commands. The seek operations may move the slider 104 to selected locations (e.g., seek targets) relative to the disk 106 to perform the commands.

The controller 120 may also be configured to determine if received commands are at risk for deprioritization. As further described herein, if received commands are at risk for deprioritization, the controller 120 may set, or select, a maximum speed for seek operations of any such at risk commands to a value that is less than a maximum possible seek speed for the slider 104. Also, as further described herein, the controller 120 may further be configured to cease a current seek operation if a higher priority command is received during the seek operation. Furthermore, the controller 120 may be configured to modify the maximum speed for the current seek operation based on commands received during seek operations.

Figure 2:
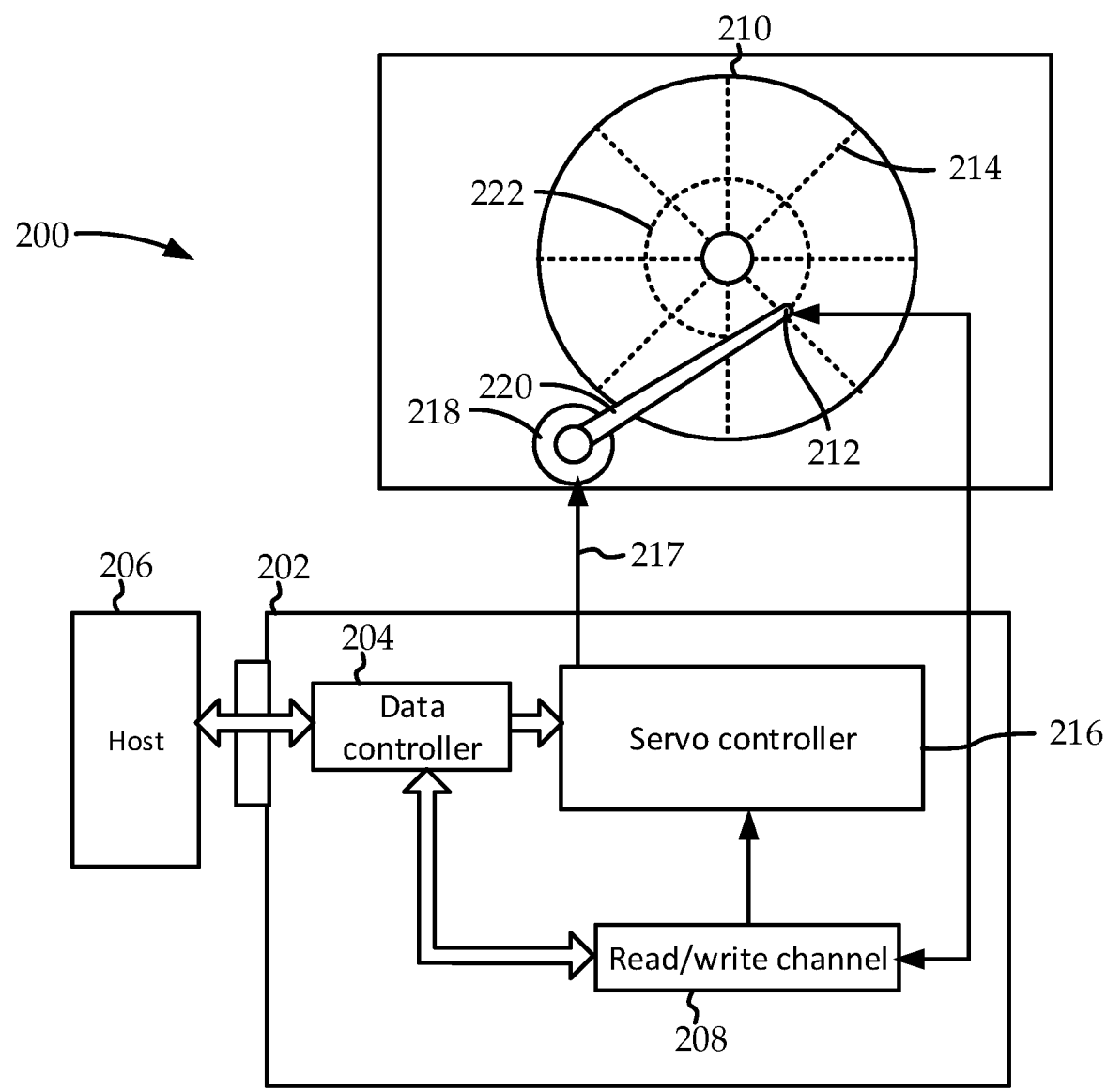
FIG. 2 is a block diagram of a hard disk drive in accordance with embodiments of the present disclosure.

FIG. 2 shows a block diagram that includes a control logic circuit 202 of a HDD 200 according to an example embodiment. The circuitry 202 includes a data controller 204 that processes read and write commands and associated data from a host device 206. The host device 206 may include any electronic device that can be communicatively coupled to store and retrieve data from a data storage device, e.g., a computer. The data controller 204 is coupled to a read/write channel 208 that reads from and writes to a surface of a magnetic disk 210.

The read/write channel 208 generally converts data between the digital signals processed by the data controller 204 and the analog signals conducted through one or more read/write heads 212 during read operations. To facilitate the read operations, the read/write channel 208 may include analog and digital circuitry such as preamplifiers, filters, decoders, digital-to-analog converters, timing-correction units, etc. The read/write channel 208 also provides servo data read from servo wedges 214 on the magnetic disk 210 to a servo controller 216. The servo controller 216 uses these signals to provide a voice coil motor control signal 217 to a VCM 218. The VCM 218 rotates an arm 220 upon which the read/write heads 212 are mounted in response to the voice coil motor control signal 217.

Data within the servo wedges 214 is used to detect the location of a read/write head 212 relative to the magnetic disk 210. The servo controller 216 uses servo data to move a read/write head 212 to an addressed track 222 and block (e.g., seek target) on the magnetic disk 210 in response to the read/write commands (e.g., seek operations). While data is being written to and/or read from the disk 210, the servo data is also used to maintain the read/write head 212 aligned with the track 222 (e.g., track following mode).

The circuitry 202 may be configured to determine if a received command is at risk for deprioritization. If a received command is at risk for deprioritization, the circuitry 202 may set a maximum speed for a seek operation to a value that is less than a maximum possible seek speed for the read/write heads 212. The seek operation may move the read/write heads 212 to a selected location relative to the magnetic disk 210 to perform the received command. The circuitry 202 may further be configured to cease the seek operation if a higher priority command is received during the seek operation. Furthermore, the circuitry 202 may be configured to adjust the maximum speed for the seek operation based on commands received during the seek operation.

Although two separate controllers 204 and 216 and a read write channel 208 have been shown for purposes of illustration, it is to be understood that their functionality described herein may be integrated within a common integrated circuit package or distributed among more than one integrated circuit package. In other words, any circuitry, processors, or digital logic can be used to provide the function of controllers 204 and 216. Similarly, a head disk assembly can include a plurality of data storage disks 210, an actuator arm 220 with a plurality of read/write heads 212 (or other sensors) which are moved radially across different data storage surfaces of the disk(s) 210 by the actuator motor 218 (e.g., voice coil motor), and a spindle motor (not shown) which rotates the disk(s) 210.

Figure 3:
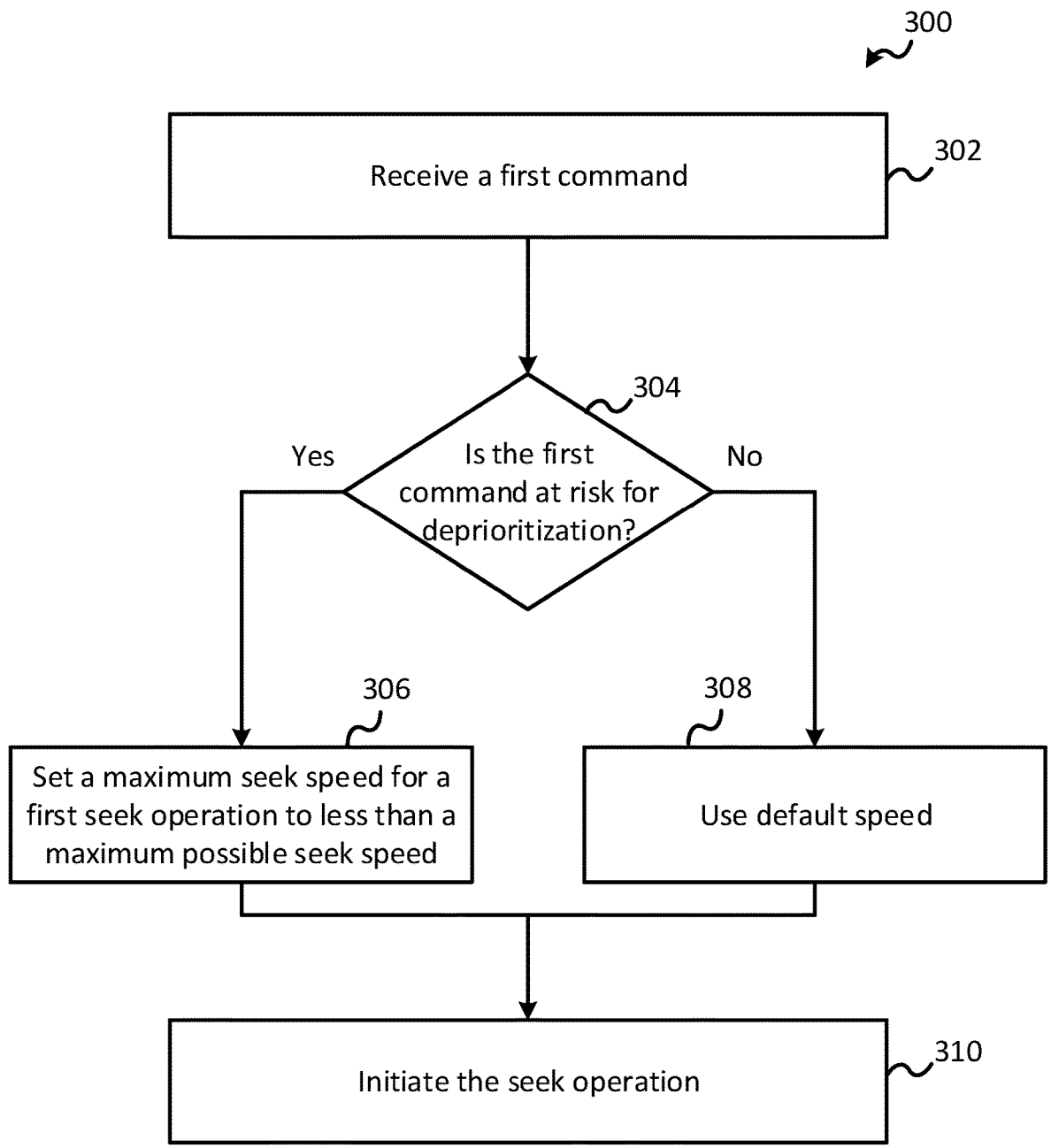
FIG. 3 is a flowchart of an illustrative method of determining seek operation speed of a command.

FIG. 3 is a flow diagram of a method 300 in accordance with embodiments of the present disclosure. The method 300 may be performed, or carried out, by HDD apparatus and systems such as, for example, apparatus 100 of FIG. 1 and HDD 200 of FIG. 2. The method 300 can include receiving a first command 302. The first command may be a read/write command or any other command for an HDD.

The first command may be received from external device such as, e.g., a processor, a controller, a server, etc. The first command may also be received from internal devices or subsystems such as, e.g., controllers, processors, memory, software, firmware, etc.

When received from internal devices, the first command may be part of a command queue that includes multiple commands. The command queue may include any number of commands. The commands in the command queue may be arranged in any order, e.g., based on time received, priority level, CCT, etc. The command queue may include information associated with each command such as, e.g., time received, time in queue, priority level, CCT, etc. The number of commands in the command queue may be monitored or tracked. Further, the number of commands at each priority level may be monitored or tracked. In this way, the HDD may be able to efficiently and quickly ascertain how many commands are in the queue and at what priority level such commands are.

The method 300 can include determining if a first command is at risk for deprioritization 304. In one example, each command may have a priority designated thereto or associated therewith based on one or more factors such as, e.g., the type of command, the urgency of the first command, etc. The priority of commands may be part of the received command or priority may be determined by a controller based on the one or more factors described herein.

In one or more embodiments, the priority of a first command may be one of a number of priority tiers or levels. Priority tiers or levels may include, e.g., high, medium, and low. Although described as having three tiers or levels, it should be appreciated that any number of predetermined tiers or levels may be used such as, e.g., at least 2 tiers, at least 3 tiers, at least 10 tiers, and/or at least 13 tiers (where higher number tiers indicate higher priority). In at least one embodiment, a first command may be at risk for deprioritization if the first command priority is below a predetermined tier. For example, the first command may be at risk for deprioritization if the first command is less than a high priority level (e.g., the first command is a medium or low priority level). In further examples, the first command may be at risk for deprioritization if the priority of the first command is less than a predetermined tier such as, e.g., tier 3, tier 10, or tier 13 (where higher number tiers indicate higher priority). It should be appreciated that any tier may be selected as the cutoff, or threshold, for deprioritization. The priority of a command may be adjusted based on considerations such as, e.g., a time period the command has spent in a command queue, a state of the HDD, etc.

If the first command is determined to be at risk for deprioritization, the method 300 can include setting a maximum seek speed for a first seek operation to move a head of the HDD to a selected location relative to a storage medium of the HDD to perform the first command to a value that is less than a maximum possible seek speed of the head and actuator 306. Such maximum seek speed for the first seek operation may be set to a value that allows the first seek operation to be ceased and a new seek operation initiated to achieve a faster CCT. For example, the maximum seek speed may be set to a value between 1% to 95% of the maximum possible seek speed. In one example, the maximum seek speed may be set to a value that is less than or equal to 10% of the maximum possible seek speed, 20% of the maximum possible seek speed, 30% of the maximum possible seek speed, 40% of the maximum possible seek speed, 50% of the maximum possible seek speed, 60% of the maximum possible seek speed, 70% of the maximum possible seek speed, 80% of the maximum possible seek speed, 90% of the maximum possible seek speed, etc. In one example, the maximum seek speed may be set to a value that is greater than or equal to 5% of the maximum possible seek speed, 15% of the maximum possible seek speed, 25% of the maximum possible seek speed, 35% of the maximum possible seek speed, 45% of the maximum possible seek speed, 55% of the maximum possible seek speed, 65% of the maximum possible seek speed, 75% of the maximum possible seek speed, 85% of the maximum possible seek speed, or 95% of the maximum possible seek speed but still less than the maximum possible seek speed. In one example, the maximum seek speed may be set to 50% of the maximum possible seek speed.

The method 300 can include using a default speed if the first command is not at risk for deprioritization 308. In one example, the default speed may be the maximum possible seek speed. For example, the maximum possible seek speed may be in a range of 30 inches per second to 100 inches per second. In one example, the maximum possible seek speed may be less than or equal to 40 inches per second, 50 inches per second, 60 inches per second, 70 inches per second, 80 inches per second, 90 inches per second, or 100 inches per second. In one example, the maximum possible seek speed may be greater than or equal to 35 inches per second, 45 inches per second, 55 inches per second, 65 inches per second, 75 inches per second, 85 inches per second, 95 inches per second.

The method 300 can include initiating the first seek operation 310 using the seek speed as set in one of processes 306, 308. As described herein, the first seek operation may be generally described as being performed, or carried out, with the seek speed set based on the priority of the first command.

Figure 4:
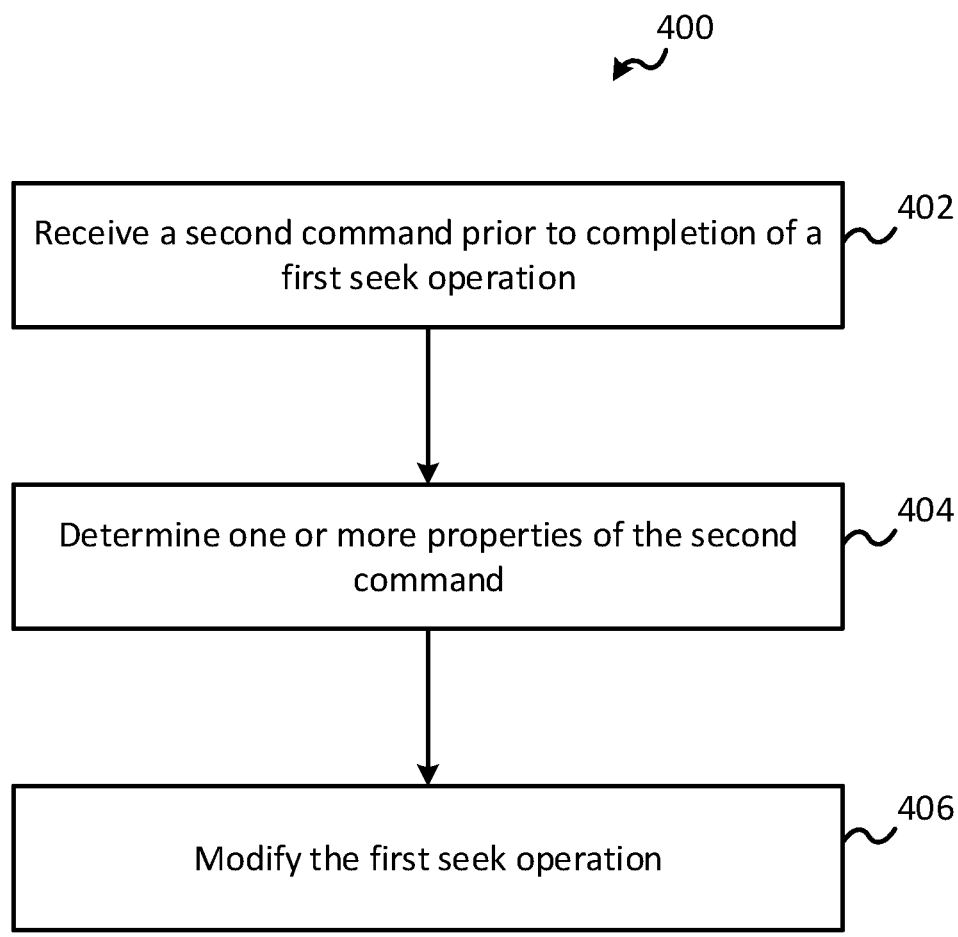
FIG. 4 is a flowchart of an illustrative method of potentially modifying a seek operation.

FIG. 4 is a flow diagram of a method 400 in accordance with embodiments of the present disclosure. The method 400 may be performed, or carried out, by HDD apparatus and systems such as, for example, apparatus 100 of FIG. 1 and HDD 200 of FIG. 2. The method 400 can include receiving a second command prior to completion of a seek operation associated with a first command 402. In other words, a first seek operation may be being executed, or performed, when the second command is received. The second command may be received in any manner described herein with regard to receiving commands.

The method 400 can include determining one or more properties of the second command 404. Determined properties of the second command may include, e.g., a priority of the second command, a time to complete a second seek operation to complete the second command, etc. The priority of the second command may be determined in any manner as described herein with respect to FIG. 3. A first command completion time to complete the second seek operation may be an amount of time it takes to complete the first seek operation before initiating the second seek operation and then complete the second seek operation. A second command completion time to complete the second seek operation may be an amount of time it takes to complete the second seek operation if the first seek operation is ceased. For example, the first seek operation may be ceased at a current position of the first seek operation when the second command is received. Furthermore, any command completion time to complete the second seek operation may be determined based on a maximum seek speed of the second seek operation and/or a destination of the second seek operation.

The method 400 can include modifying the first seek operation 406. Modifying the first seek operation may be based on the one or more determined properties of the second command such as, e.g., the priority of the second command and/or the time to complete the second command. In one example, modifying the first seek operation may include ceasing the first seek operation if the priority of the second command is greater than a priority of the first command. Ceasing the first seek operation may include initiating the second seek operation to perform the second command, which likely has a seek target different from a seek target of the first command. Initiating the second seek operation may include accelerating a head of the HDD and/or decelerating a head of the HDD to move the head to the seek target of the second command.

In another example, modifying the first seek operation may include increasing the maximum seek speed for the first seek operation if a priority of the first command is greater than or equal to a priority of a second command. The maximum seek speed may be increased to a speed greater than the initial maximum seek speed and less than or equal to the maximum possible seek speed. Increasing the maximum seek speed may decrease a CCT of the first command such that, e.g., the second command may also be completed faster since the first command will now be completed faster.

In one example, first and second command completion times of the second seek operation may be determined. Modifying the first seek operation may be based on the first and second CCTs of the second seek operation. The first CCT may be determined based on the time to complete a second seek operation to perform the second command if completing the first seek operation before initiating the second seek operation. The second CCT may be determined based on the time to complete the second seek operation if ceasing the first seek operation. In one example, modifying the first seek operation may include ceasing the first seek operation if the second CCT is less than the first CCT. In another example, modifying the first seek operation may include increasing the maximum seek speed for the first seek operation if the second command completion time is greater than or equal to the first command completion time.

In another example, a pending command queue may be defined. The pending command queue may include multiple received commands to be executed. Modifying the first seek operation may include increasing the maximum seek speed of the first seek operation based on one or more properties of the command queue such as, e.g., the number of received commands in the pending command queue. For example, the maximum seek speed of the first seek operation may be increased based on the number of received commands in the pending command queue being equal to or greater than a threshold number of commands. Such increase in the maximum seek speed may accelerate completion of the commands in the pending command queue. The increase in the maximum seek speed may be maintained until the number of received commands in the pending command queue is below the threshold number of commands.

Figure 5:
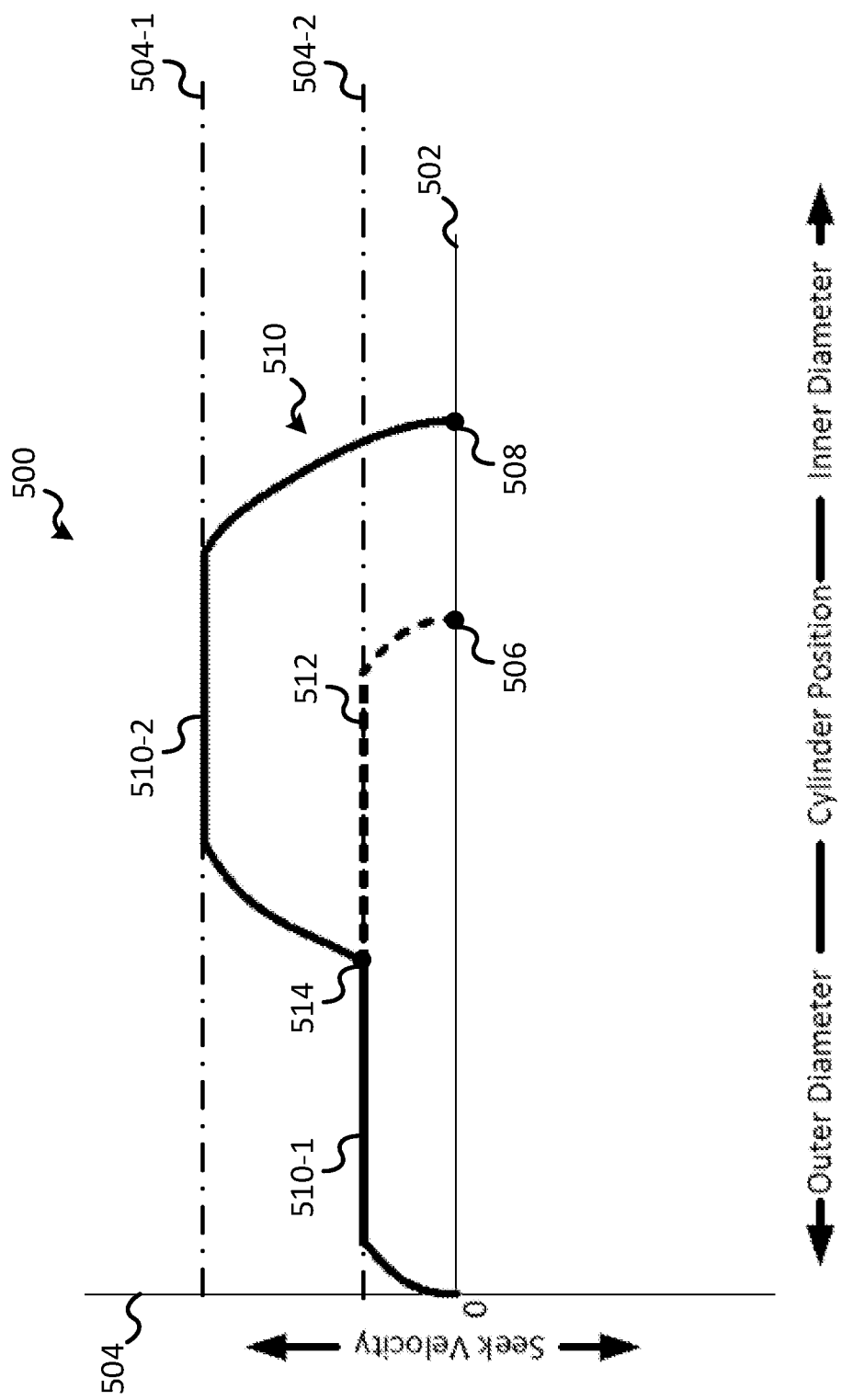
FIG. 5 is a graph of seek velocities and cylinder position of a head relative to a disk during a modified seek operation in accordance with the illustrative systems and methods of FIGS. 1-4.

FIG. 5 is a graph 500 of an example seek velocity and cylinder position of a head relative to a disk (e.g., data medium) during a modified seek operation in accordance with the illustrative systems and methods of FIGS. 1-4. As shown, the graph 500 includes x-axis 502 that represents a cylinder position of the head with an outermost diameter of the disk at the origin of the graph and the innermost diameter of the disk at the highest x-axis values. Furthermore, the graph 500 includes y-axis 504 that represents seek velocity of the head and actuator. A maximum possible seek speed 504-1 (e.g., velocity magnitude) is represented by a first dashed-dot line and a maximum seek speed 504-2 less than the maximum possible seek speed is represented by another dashed-dot line.

As illustrated in FIG. 5, an seek operation for a low priority command is initially being performed. Since the command is low priority, it is at risk for deprioritization, and thus, the illustrative systems and methods described herein may set the maximum seek speed 504-2 to a value lower than the maximum possible seek speed 504-1. As can be seen, the head accelerates from a velocity/speed of zero to the maximum seek speed 504-2, which, as described, is lower than the maximum possible seek speed 504-1. A new command is received during the initial seek operation 510-1, the initial seek operation is ceased 514, the first seek target 506 is abandoned, and a new seek operation 510-2 is commenced by accelerating the head to the maximum possible seek speed 504-1. The new seek operation 510-2 decelerates and ultimately stops at a seek target 508 of the new command.

As shown, the graph 500 includes an initial (e.g., first) seek target 506 for the low priority command and a new (e.g., second) seek target 508 for the new command. The solid line 510 represents the actual seek velocity and position of the head and the dotted line 512 represents the original intended seek velocity and position of the head for the initial seek operation. The solid line 510 includes an initial (e.g., first) seek operation 510-1 and new (e.g., second) seek operation 510-2 separated by a seek cessation 514.

As shown, the initial seek may have a maximum seek speed 504-2 that is less than the maximum possible seek speed 504-1 to better accommodate the seek cessation 514 and the new seek target 508 prior to completion of the initial seek 510-1. As described herein, if the initial seek 510-1 utilized the maximum possible seek speed 504-1, such speed may impair or prevent the ability to cease the initial seek 510-1 efficiently.

As shown, the new seek operation 510-2 is not limited to the maximum seek speed 504-2 but is performed, or executed, at the maximum possible seek speed 504-1. This may allow the new seek operation 510-2 to be executed as fast as possible. The new seek operation 510-2 may be executed at the maximum possible seek speed 504-1 because the associated command for the new seek operation is not at risk for deprioritization because, e.g., the associated command has a higher priority than the command associated with the first seek operation 510-2, the associated command has a priority higher than a predetermined tier, etc.

In this example, the new seek target 508 is in the same direction from the head position as the initial seek target 506 at the cease 514. Accordingly, the head did not need to stop moving, and instead, has been sped up (e.g., the velocity of the head was increased) for the new seek operation 510-2.

Figure 6:
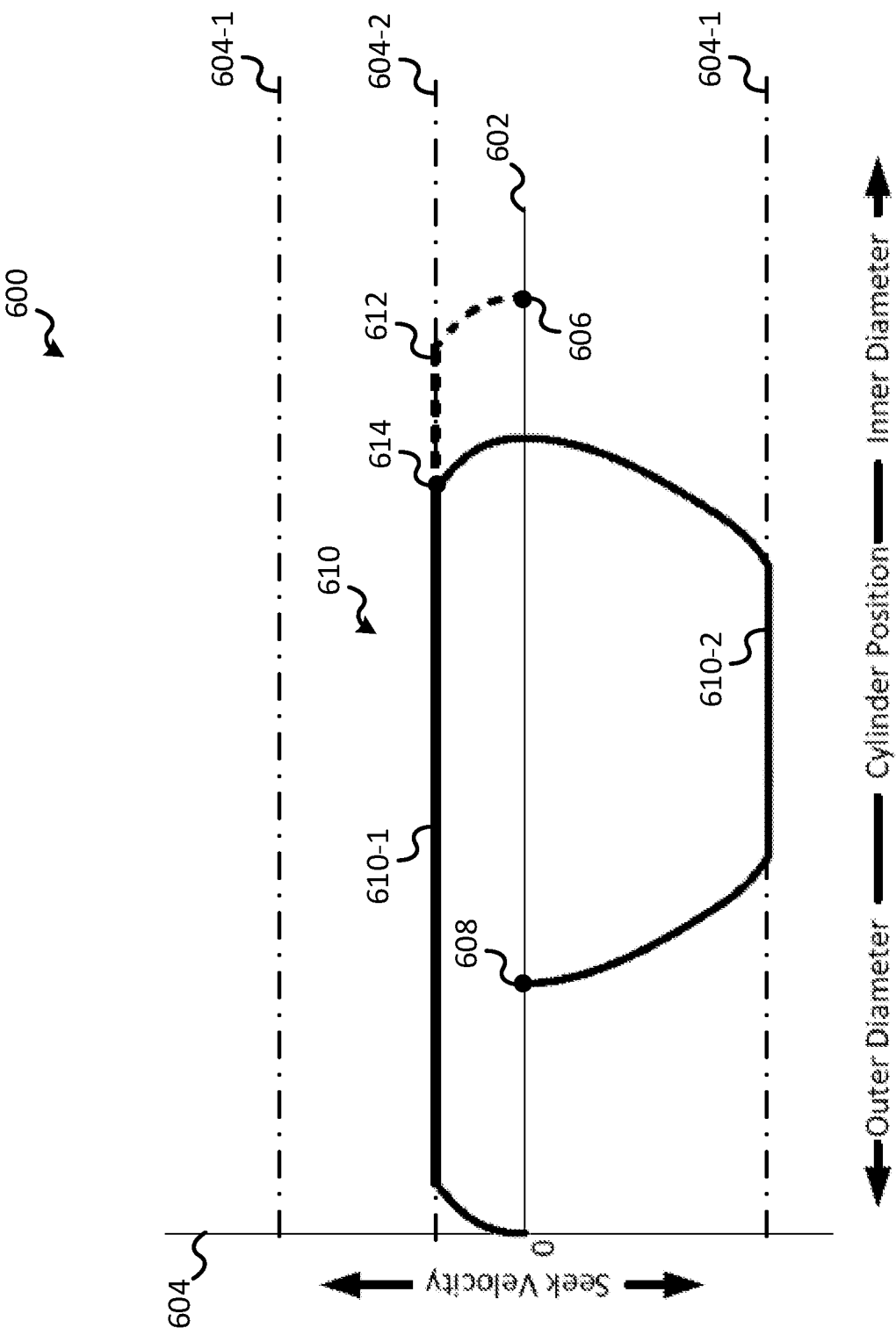
FIG. 6 is another graph of seek velocities and cylinder position of a head relative to a disk during a modified seek operation in accordance with the illustrative systems and methods of FIGS. 1-4.

FIG. 6 is a graph 600 of another seek velocity and cylinder position of a head relative to a disk (e.g., data medium) during a modified seek operation in accordance with the illustrative systems and methods of FIGS. 1-4. As shown, the graph 600 includes x-axis 602 that represents a cylinder position of the head with an outermost diameter of the disk at the origin of the graph and the innermost diameter of the disk at the highest x-axis values. Furthermore, the graph 600 includes y-axis 604 that represents seek velocity of the head and actuator. A maximum possible seek speed 604-1 (e.g., velocity magnitude) is represented by dashed-dot lines and a maximum seek speed 604-2 less than the maximum possible seek speed is represented by another dashed-dot line.

As illustrated in FIG. 6, an seek operation for a low priority command, is initially being performed. Since the command is low priority, it is at risk for deprioritization, and thus, illustrative systems and methods described herein may set the maximum seek speed 604-2 to a value lower than the maximum possible seek speed 604-1. As can be seen, the head accelerates from a velocity/speed of zero to the maximum seek speed 604-2, which, as described, is lower than the maximum possible seek speed 604-1. A new command is received during the initial seek operation 610-1, the initial seek operation is ceased 614, the first seek target 606 is abandoned, and a new seek operation 610-2 is commenced by accelerating the head to the maximum possible seek speed 604-1 in the opposite direction. The new seek operation 610-2 decelerates and ultimately stops at a seek target 608 of the new command.

As shown, the graph 600 includes an initial (e.g., first) seek target 606 for the low priority command and a new (e.g., second) seek target 608 for the new command. The solid line 610 represents the actual seek velocity and position of the head and the dotted line 612 represents the original intended seek velocity and position of the head for the initial seek operation. The solid line 610 includes an initial (e.g., first) seek operation 610-1 and new (e.g., second) seek operation 610-2 separated by a seek cessation 614.

As shown, the initial seek may have a maximum seek speed 604-2 that is less than the maximum possible seek speed 604-1 to better accommodate the seek cessation 614 and the new seek target 608 prior to completion of the initial seek 610-1. As described herein, if the initial seek 610-1 utilized the maximum possible seek speed 604-1, such speed may impair or prevent the ability to cease the initial seek 610-1 efficiently.

As shown, the new seek operation 610-2 is not limited to the maximum seek speed 604-2 but is performed, or executed, at the maximum possible seek speed 604-1. This may allow the new seek operation 610-2 to be executed as fast as possible. The new seek operation 610-2 may be executed at the maximum possible seek speed 604-1 because the associated command for the new seek operation is not at risk for deprioritization because, e.g., the associated command has a higher priority than the command associated with the first seek operation 610-2.

In this example, the new seek target 608 is in the opposite direction from the head position than the initial seek target 606 at the cease 614. Accordingly, the head decelerates to zero velocity and speeds up to a negative velocity to travel in the opposite direction at the maximum possible speed 604-1.

Figure 7:
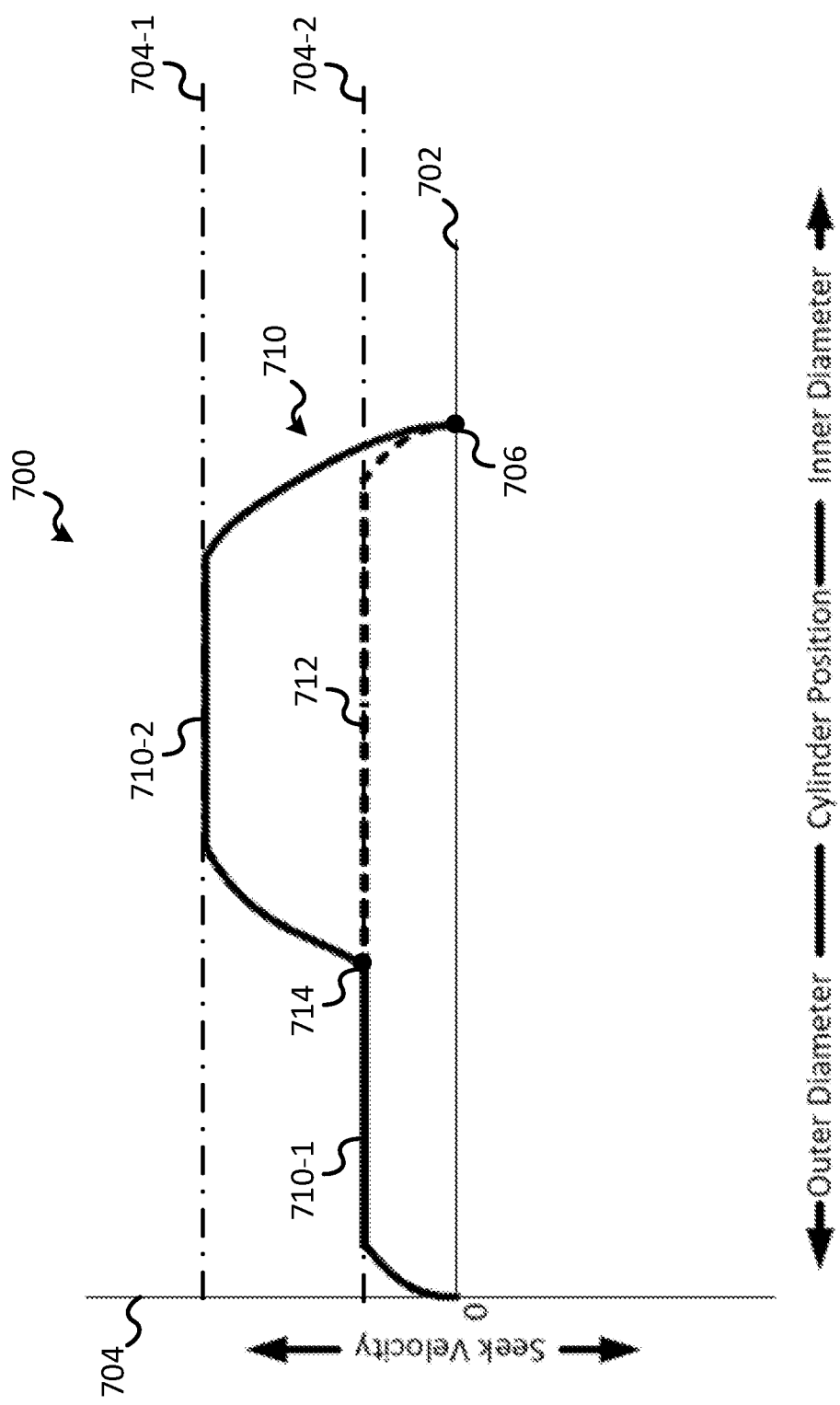
FIG. 7 is another graph of seek velocities and cylinder position of a head relative to a disk during a modified seek operation in accordance with the illustrative systems and methods of FIGS. 1-4.

FIG. 7 is a graph 700 of another seek velocity and cylinder position of a head relative to a disk (e.g., data medium) during a modified seek operation in accordance with the illustrative methods and system of FIGS. 1-4. As shown, the graph 700 includes x-axis 702 that represents a cylinder position of the head with an outermost diameter of the disk at the origin of the graph and the innermost diameter of the disk at the highest x-axis values. Furthermore, the graph 700 includes y-axis 704 that represents seek velocity of the head and actuator. A maximum possible seek speed 704-1 (e.g., velocity magnitude) is represented by dashed-dot lines and a maximum seek speed 704-2 less than the maximum possible seek speed is represented by another dashed-dot line.

As illustrated in FIG. 7, an seek operation for a low priority command, is initially being performed. Since the command is low priority, it is at risk for deprioritization, and thus, the illustrative systems and methods described herein may set the maximum seek speed 704-2 to a value lower than the maximum possible seek speed 704-1. As can be seen, the head accelerates from a velocity/speed of zero to the maximum seek speed 704-2, which, as described, is lower than the maximum possible seek speed 704-1. A new command is received during the initial seek operation 710-1. However, the new command may be a low priority command with a priority as low as or lower than the command initially being performed or ceasing the initial seek operation 710-1 may not improve a CCT of the new command. Thus, the illustrative systems and methods described herein may not abandon the original seek target 706 nor cease the initial seek operation. Instead, the initial seek operation 710-1 is accelerated to the maximum possible seek speed 704-1. Thus, the initial seek operation 710-1 becomes a modified seek operation 710-2. In other words, the illustrative systems and methods modified the initial seek operation 710-1 in view of reception of the new command.

As shown, the graph 700 includes an initial seek target 706 for the low priority command. The solid line 710 represents the actual seek velocity and position of the head and the dotted line 712 represents the original intended seek velocity and position of the head for the initial seek operation. The solid line 710 includes an initial seek operation 710-1 and a modified seek operation 710-2 separated by modification point 714.

As shown, the initial seek may have a maximum seek speed 704-2 that is less than the maximum possible seek speed 704-1 to better accommodate possible modifications such as, for example, a new seek target prior to completion of the initial seek 710-1.

As shown, the modified seek operation 710-2 is not limited to the maximum seek speed 704-2 but is performed, or executed, at the maximum possible seek speed 704-1. This may allow the modified seek operation 710-2 to be executed as fast as possible. The modified seek operation 710-2 may be executed at the maximum possible seek speed 704-1 because the command is no longer at risk for deprioritization because, e.g., the one or more newer commands with a lower priority have been received or a new command has been received and ceasing the initial seek operation 710-1 may not improve a CCT of the new command.

Whether or not the first seek operation is ceased may further be based on additional considerations. In one example, the first seek operation may only be ceased if the head and/or actuator are at the maximum seek speed for the first seek operation. In another example, the first seek operation may only be ceased if the maximum seek speed is less than the maximum possible seek speed. In another example, the first seek operation may not be ceased when a higher priority command is received such that, if the first seek is sped up, the first seek can be completed and the seek target of the higher priority command can be reached as fast as if the first seek was ceased. In still another example, the first seek operation may not be ceased if a scheduling determination based on commands in a command queue determines that continuing the first seek at a faster speed may provide greater energy savings, faster CCTs, etc.

Thus, various embodiments of CHANGE HDD SEEK TARGET MID-SEEK are disclosed. Although reference is made herein to the accompanying set of drawings that form part of this disclosure, one of at least ordinary skill in the art will appreciate that various adaptations and modifications of the embodiments described herein are within, or do not depart from, the scope and spirit of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. Further, the term "and/or" (if used) means one or all of the listed elements or a combination of any two or more of the listed elements.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its non-exclusive sense meaning "and/or" unless the content clearly dictates otherwise.

As used herein, "have," "having," "include," "including," "comprise," "comprising" or the like are used in their open ended sense, and generally mean "including, but not limited to". It will be understood that "consisting essentially of," "consisting of" and the like are subsumed in "comprising," and the like.

The phrases "at least one of," "comprises at least one of," and "one or more of" followed by a list refers to any one of the items in the list and any combination of two or more items in the list.

What is claimed is:

1. An apparatus comprising:
   a head to read or write data to a storage medium;
   an actuator operatively coupled to the head to move the head; and
   a controller comprising one or more processors and operatively coupled to the actuator to control movement of the head, the controller configured to:
   receive a first command;
   determine if the first command is at risk for deprioritization;
   if the first command is determined to be at risk for deprioritization, set a maximum seek speed for a first seek operation to move the head to a selected location relative to the storage medium to perform the first command to a value that is less than a maximum possible seek speed of the head and actuator; and
   initiate the first seek operation.

2. The apparatus of claim 1, wherein the controller is further configured to:
   receive a second command prior to completion of the first seek operation;
   determine a priority of the second command; and modify the first seek operation based on the priority of the second command.

3. The apparatus of claim 2, wherein the modification to the first seek operation comprises cessation of the first seek operation if a priority of the first command is less than the priority of the second command.

4. The apparatus of claim 2, wherein the modification to the first seek operation comprises increasing the maximum seek speed for the first seek operation if a priority of the first command is greater than or equal to the priority of the second command.

5. The apparatus of claim 1, wherein the controller is further configured to:
receive a second command prior to completion of the first seek operation;
determine a first command completion time to complete a second seek operation to perform the second command if completing the first seek operation before initiating the second seek operation;
determine a second command completion time to complete the second seek operation if ceasing the first seek operation; and
modify the first seek operation based on the first and second command completion times.

6. The apparatus of claim 5, wherein modifying the first seek operation comprises ceasing the first seek operation and initializing the second seek operation if the determined second command completion time is less than the first command completion time.

7. The apparatus of claim 5, wherein modifying the first seek operation comprises increasing the maximum seek speed for the first seek operation if the second command completion time is greater than or equal to the first command completion time.

8. The apparatus of claim 1, wherein the controller is further configured to: receive a second command prior to completion of the first seek operation; and
modify the first seek operation based on the second command if the head is moving at the maximum seek speed for the first seek operation.

9. The apparatus of claim 1, wherein the controller is further configured to permit modification of the first seek operation if the first command is at risk for deprioritization.

10. The apparatus of claim 1, wherein the controller is further configured to: define a pending command queue to store received commands; and
increase the maximum seek speed of the first seek operation based on a number of commands in the pending command queue.

11. The apparatus of claim 1, wherein the first command at risk for deprioritization comprises at least one of a background activity, cleaning, or destaging.

12. The apparatus of claim 1, wherein the first command not at risk for deprioritization comprises at least one of a read command or a write command.

13. The apparatus of claim 1, wherein the maximum seek speed is less than or equal to 50% of the maximum possible seek speed.

14. A system comprising:
a head to read or write data to a storage medium;
an actuator operatively coupled to the head to move the head; and
a controller comprising one or more processors and operatively coupled to the actuator to control movement of the head, the controller configured to:
receive a first command;
determine if the first command is at risk for deprioritization;
if the first command is determined to be at risk for deprioritization:
set a maximum seek speed for a first seek operation to move the head to a selected location relative to the storage medium to perform the first command to a value that is less than a maximum possible seek speed of the head and actuator; and
permit modification of the first seek operation; and
initiate the first seek operation.

15. The system of claim 14, wherein the controller is further configured to:
receive a second command prior to completion of the first seek operation;
determine a priority of the second command; and
modify the first seek operation based on the priority of the second command.

16. The system of claim 14, wherein the controller is further configured to:
receive a second command prior to completion of the first seek operation;
determine a second command completion time to complete a second seek operation to perform the second command based on a current position and the maximum seek speed of the first seek operation; and
modify the first seek operation based on the second command completion time.

17. A method comprising:
determining if a first command is at risk for deprioritization;
setting a maximum seek speed for a first seek operation to move a head to a selected location relative to a storage medium to perform the command to a value that is less than a maximum possible seek speed of the head and an actuator if the first command is at risk for deprioritization; and
initiating the first seek operation.

18. The method of claim 17, further comprising:
receiving a second command prior to completion of the first seek operation;
determining a priority of the second command; and
modifying the first seek operation based on the priority of the second command.

19. The method of claim 17, further comprising:
receiving a second command prior to completion of the first seek operation;
determining a time to complete a second seek operation to perform the second command based on a current position and the maximum seek speed of the first seek operation; and
modifying the first seek operation based on the time to complete a second seek operation.

20. The method of claim 17, further comprising permitting modification of the first seek operation if the first command is at risk for deprioritization.

* * * * *